United States Patent [19]

Gallet et al.

[11] 4,038,136
[45] July 26, 1977

[54] SUPPORT STRUCTURE FOR THE LATERAL NEUTRON SHIELD SYSTEM OF A FAST REACTOR CORE

[75] Inventors: Bernard Gallet, Bruyeres-le-Chatel; Robert Venot, Fontenay-aux-Roses, both of France

[73] Assignee: Commissariat a l'Energie Atomique, Paris, France

[21] Appl. No.: 584,762

[22] Filed: June 9, 1975

[30] Foreign Application Priority Data

June 11, 1974   France ................... 74.20214

[51] Int. Cl.² .......................................... G21C 13/00
[52] U.S. Cl. .................................. 176/87; 176/40; 176/50; 176/65; 248/68 R
[58] Field of Search ................. 176/40, 50, 61, 64, 176/65, 87; 248/49, 68 R

[56] References Cited

U.S. PATENT DOCUMENTS

| | | | |
|---|---|---|---|
| 3,105,808 | 10/1963 | Lawson et al. | 176/87 |
| 3,215,608 | 11/1965 | Guenther | 176/87 |
| 3,549,493 | 12/1970 | Germer | 176/87 X |
| 3,666,624 | 5/1972 | Finch et al. | 176/50 X |
| 3,861,999 | 1/1975 | Zmola et al. | 176/61 |
| 3,873,419 | 3/1975 | Sletten | 176/40 X |
| 3,878,870 | 4/1975 | Atherton et al. | 176/61 X |
| 3,892,625 | 7/1975 | Patterson | 176/50 |
| 3,937,653 | 2/1976 | Leheu | 176/87 X |

OTHER PUBLICATIONS

Patterson, Def. Pub. of SN 262,434 filed June 13, 1972, Published in 909 O.G. 795 on Apr. 17, 1973, Def. Pub. No. T909,019.

Primary Examiner—Peter A. Nelson
Attorney, Agent, or Firm—Cameron, Kerkam, Sutton, Stowell & Stowell

[57] ABSTRACT

A hexagonal ring structure whose internal contour conforms to the external contour of the reactor core rests on the periphery of the reactor diagrid and is constituted by a plurality of layers of metallic plates. The layers are maintained in relative positional relation by means of clamping members, the plates of one layer being angularly displaced with respect to the plates of adjacent layers. The bottom end-connectors of the elements constituting the lateral shield system are fitted in vertical through-holes formed in the ring structure.

5 Claims, 4 Drawing Figures

SUPPORT STRUCTURE FOR THE LATERAL NEUTRON SHIELD SYSTEM OF A FAST REACTOR CORE

This invention relates to a structure for supporting the lateral neutron shield system of a fast reactor core.

It is known that the core of a fast reactor which is cooled with liquid sodium is surrounded by a neutron shield system. The top and bottom shield are formed by elements which are introduced directly above and beneath the fuel assemblies which constitute the reactor core. The lateral shield of the reactor core is constituted by elements which have the same shape as the fuel assemblies and surround the reactor core.

A better understanding of the problem to be solved will be obtained by referring to FIG. 1 of the accompanying drawings, in which is shown diagrammatically the lower portion of a sodium-cooled fast reactor.

There can be seen in this figure the lower portion 2 of the metallic vessel which contains the complete reactor assembly, that is to say essentially the reactor core 4, the primary sodium and the primary pumps 5 and the primary heat exchangers 3.

The reactor core 4 rests on a diagrid 6 in which the bottom end-fittings of the fuel elements constituting the core 4 are inserted. The diagrid also permits the flow of cold primary sodium within said fuel assemblies, said primary sodium being injected into the diagrid 6 through ducts such as the duct 8 which are connected to the outlets of the primary pumps 5.

The diagrid rests on a support grid 10 which is rigidly fixed to the wall 2 of the reactor vessel by means of a frusto-conical shell-plate 12. The lateral neutron shield is generally designated by the reference numeral 14 and surrounds the reactor core. The neutron shield elements are, for example, round stainless steel members of hollow construction, the top portion of which is level with the top portion of the fuel elements constituting the reactor core 4. The bottom end-connectors of the lateral shield elements are inserted in a so-called "false grid" 16 or ring-shaped support structure which rests on the periphery of the diagrid 6. The false grid is higher than the diagrid and surrounds the reactor core 4, with the result that a peripheral side restraint is applied to the base of the core.

The design function of the false grid 16 is therefore to ensure that the neutron-shielding elements 14 are rigidly maintained in position and that said elements can also be cooled by the liquid sodium. In addition, the false grid must afford peripheral side restraint for the reactor core.

One known false grid arrangement consists in designing this latter in six sectors which are not joined together but connected to the diagrid by means of a system of keys. Each sector is formed by a bottom plate and a top plate which are pierced by bores at the bottom of the system of shield assemblies and separated by hollow spacer members placed at the level of said bores. The bottom end-connectors of the shield assemblies are intended to be fitted in the bores of said spacer members. Tie-rods which serve to connect the top and bottom plates ensure powerful clamping of these latter against the spacer members. Sodium coolant is supplied to the lateral shield assemblies through lateral holes which are formed in said spacer members and which must therefore occupy precise positions both angularly and in height. For this reason, after the spacer members have been machined to the required tolerances, they must accordingly be oriented on the false grid at the time of assembly. This result is relatively difficult to obtain and calls for the presence of positioning studs carried on the top face of the bottom plate. Moreover, by reason of the fact that the sectors are independent, the false grid does not permit of effective application of peripheral side restraint to the fuel assemblies of the reactor core.

The precise aim of the present invention is to provide a support structure for the lateral shield system of a fast reactor core which overcomes the disadvantages mentioned in the foregoing by making it possible in particular to provide a peripheral side restraint for the reactor core, simple forms of construction and higher structural rigidity of the core as a whole and of its neutron shield systems.

The structure for supporting the lateral neutron shield system of a fast reactor core is distinguished by the fact that the structure has the shape of a horizontal hexagonal ring whose internal contour coincides exactly with the external contour of the reactor core, the bottom face of said ring structure being intended to rest on the periphery of the core support structure, said ring structure being constituted by a plurality of layers of metallic plates, said layers being maintained in relative positional relation by means of clamping members, the metallic plates of one layer being angularly displaced with respect to the plates of adjacent layers, said ring structure being penetrated by vertical through-holes in which are fitted the bottom end-connectors of the elements constituting the lateral shield system.

In a first embodiment, the layers of metallic plates are contiguous.

In a second embodiment, two successive layers of metallic plates are separated by washers of small thickness.

As a preferable feature, the members for clamping the layers together consist of tie-bolts.

A more complete understanding of the invention will in any case be gained from the following description of two embodiments of the invention which are given by way of example without any limitation being implied. In this description, reference is made to the accompanying drawings in which:

FIG. 1 described earlier is a view in sectional elevation showing the lower portion of a fast reactor;

Figure 1:
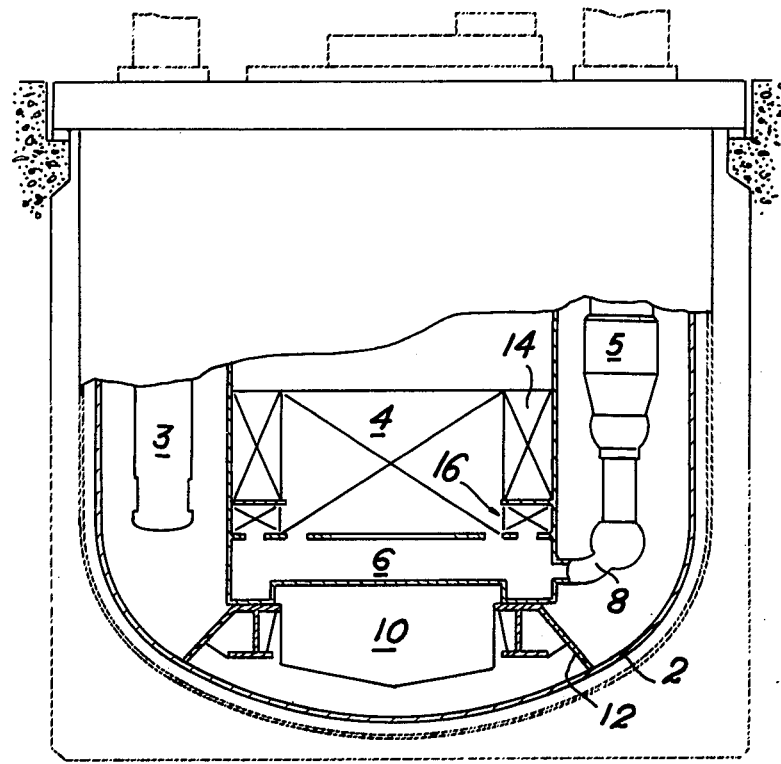
Figure 2:
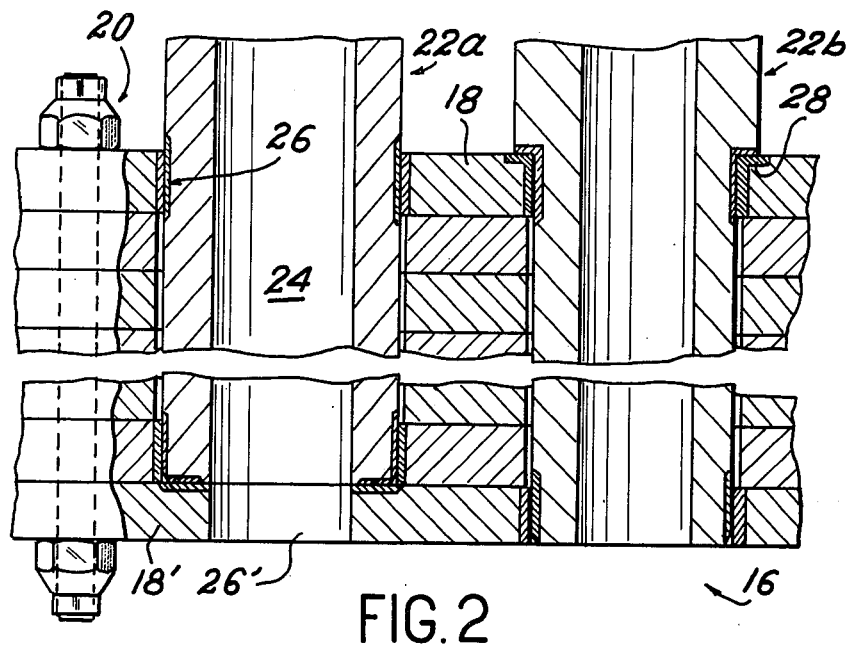
FIG. 2 is a view in sectional elevation showing a first embodiment of the false grid.

A first embodiment of the false grid is shown respectively in elevation and in cross-section in FIG. 2.

In this first alternative form of construction, the false grid 16 is constituted by a stack of metallic layers such as the layer 18. In the particular example shown in the figure, the desired thickness is obtained by stacking seven layers.

The layers are maintained in relative positional relation by means of tie-bolts such as 20. The bottom end-connectors of the elements 22 which constitute the lateral shield 14 are inserted in the false grid by means of bores 24 which are formed in said false grid and are obviously disposed so as to have a pitch equal to that of the elements forming the shield system.

Two types of bottom end-connectors can be considered for the lateral shield elements: the type shown at 22a and the type shown at 22b. In the case of the element 22a, the end-connector is not provided with a shouldered portion. The bore 24 into which is inserted the end-connector of the element 22a is constituted by superposed bores 26 formed in each layer 18. The bottom layer 18' is provided with a bore 26' of smaller diameter which locks the shield element in position while permitting the coolant sodium to pass through.

In the case of the alternative form of construction of the lateral shield element 22b, this latter is provided with a shouldered portion 28. It is therefore no longer necessary to provide the bottom layer 18' with a bore of smaller diameter. Stellited portions are also shown at the level of the shoulder 28 of the element 22b and at the level of the bottom layer 18'.

Figure 3:
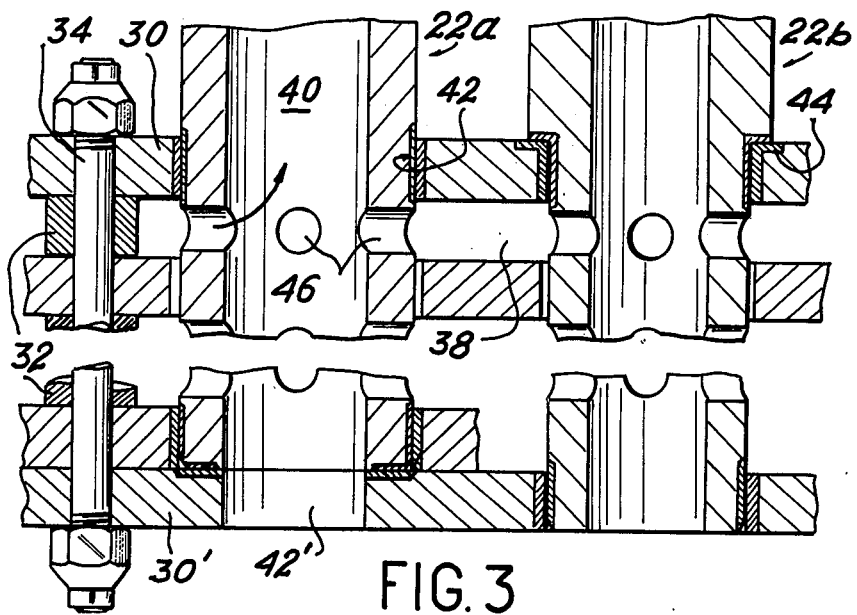
FIG. 3 is a view taken along the same section plane and showing an alternative embodiment of the false grid.

An alternative form of construction of the false grid is shown in FIG. 3 along the same plane of section. In this alternative design, the false grid is again formed by means of a plurality of superposed layers 30a. However, instead of being contiguous as in the example illustrated in FIG. 2, said layers are spaced at a short distance from each other by means of washers such as 32 which are introduced around tie-bolts 34 and interposed between two consecutive layers. The advantage of this alternative form of construction lies in the fact that it is no longer necessary to grind the entire face of each plate 30. It is in fact only necessary to machine the plates 30 at the level of the washers 32. Moreover, the lateral shield elements are supplied with sodium not only through the bottom end-connector but also through the gaps 38 formed between two consecutive plates. So far as the remainder of the structure is concerned, exactly the same elements are again shown in the figure. The bottom end-connector of the shield element is introduced into a bore 40 which extends right through the false grid. Said bore results from the superposed arrangement of bores such as 42 which are formed in each plate 30. There are again shown the two arrangements which were already illustrated in FIG. 2 and which correspond to the two alternative designs of the bottom end-connectors of the lateral shield elements as designated respectively by the references 22a and 22b.

In the first alternative embodiment (22a), the end-connector is not provided with a shouldered portion and the bottom layer 30' has a bore 42' of smaller diameter, the end-connector which is applied against the shouldered portion being formed by the portion which projects from the plate 30'; on the contrary, in the alternative embodiment corresponding to the element 22b, this latter has a shouldered portion 44 and no provision is made for the bottom plate 30'. There are again shown exactly the same stellited surfaces as in the alternative embodiment shown in FIG. 2.

However, it must be pointed out that, at the level of the gaps formed between two consecutive layers 30, the bottom end-connector of the lateral shield element is provided with an orifice such as 46 through which the coolant sodium is premitted to pass. There are therefore two sodium inlets, namely through the bore 42' of the bottom plate 30' and through the orifices 46 of the bottom end-connector of the lateral shield element.

Figure 4:
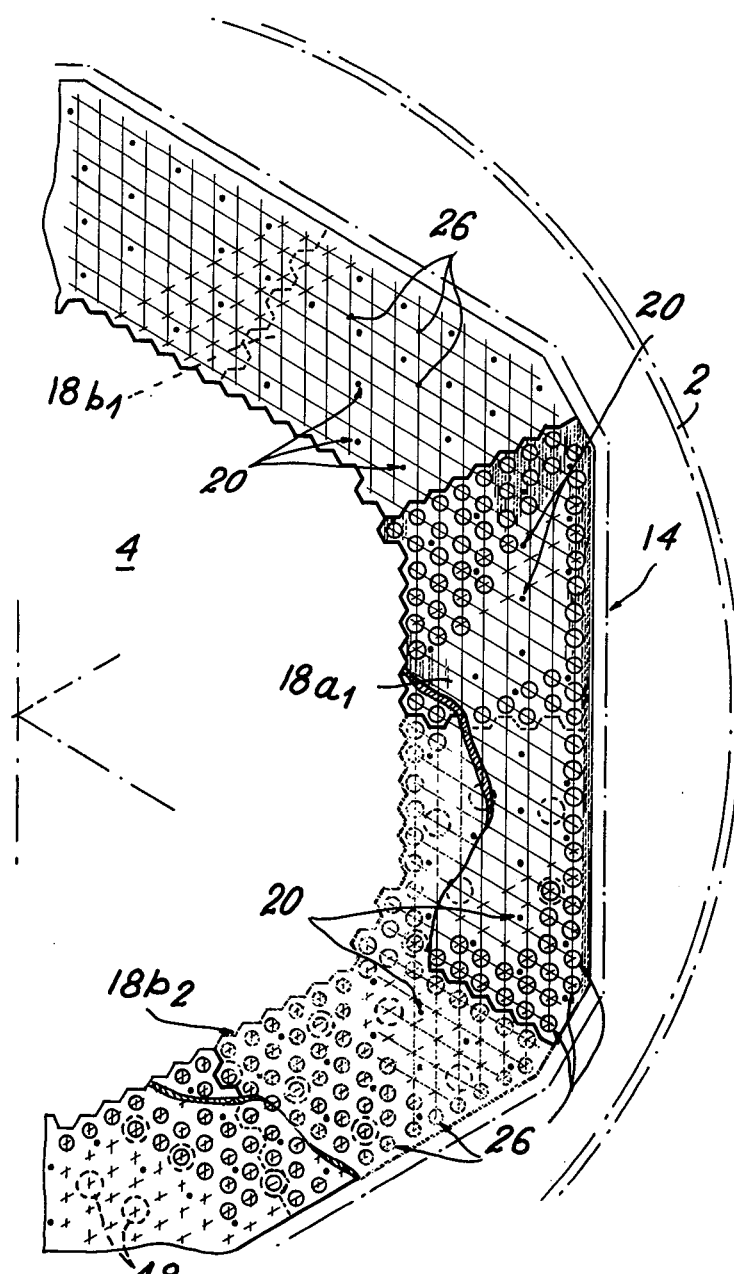
FIG. 4 is a top view showing one-half of the false grid.

The top view of FIG. 4 shows one half of the false grid, said grid being clearly symmetrical with respect to the axis which limits the half-view.

The false grid has the shape of a ring and the line which limits its internal contour has exactly the same shape as the external contour of the reactor core. Since the false grid is slightly higher than the diagrid, said grid ensures peripheral side restraint for the base of the reactor core.

As already stated in the description with reference to the previous figures, the false grid is constituted by a plurality of metallic layers 18. In the example shown in FIG. 4, each layer is constituted by six juxtaposed plates 18. To take the example of FIG. 2, there are seven contiguous layers of plates. In order to ensure that the plates of one and the same layer are rigidly coupled together, the plates of a given layer are angularly displaced with respect to the plates of the layer beneath. Thus, the plate $18a_1$ of the top layer covers one-half of the plate $18b_1$ and $18b_2$ of the second layer. Since the plates of the different layers are connected to each other by means of the tie-bolts, the relative angular displacement of the plates of two successive layers ensures rigid interassembly of the plates which constitute the same layer without entailing any need for a mechanical connection between the edges of two adjacent plates of any one layer. In addition, the bores 26 for the insertion of the bottom end-connectors of the lateral shield elements are represented diagrammatically by intersections and the bearing members 48 on which the false grid is supported on the diagrid are represented by circles in broken outline.

This form of construction of the false grid offers a large number of advantages over those of the prior art. In particular, it no longer requires complicated machining. Accurate boring and milling operations have in fact been replaced by a simple boring operation for the introduction of the bottom end-connectors of the lateral shield elements. There are no longer any spacer members between the top plate and the bottom plate, with the result that the problem of angular positioning of the end-connectors of the shield elements no longer arises. A better peripheral side restraint is provided for the reactor core by virtue of sectors which are interconnected by means of plates arranged in overlapping relation. Finally, a higher degree of strength and rigidity of the entire structure is obtained.

What we claim is:

1. A support structure for the lateral neutron shield system of a fast reactor core, said core being a vertical axis of symmetry and including a core support structure and a lateral neutron shield wherein said structure is a horizontal ring having an internal contour coinciding exactly with an external contour of the reactor core, a bottom face of said ring being supported by a periphery of said core support structure, said ring comprising a plurality of horizontal layers of metallic plates, clamping members maintaining said layers in relative positional relation, said metallic plates of one layer being angularly displaced around said axis of symmetry and overlappedly engaging said plates of adjacent layers, vertical through-holes in said ring receiving bottom end-connectors of elements of said neutron shield.

2. A structure according to claim 1, wherein the layers of metallic plates are contiguous.

3. A structure according to claim 1, including thin washers separating two successive layers of metallic plates.

4. A structure according to claim 1, wherein said clamping members are tie-bolts.

5. A structure according to claim 4, including thin washers separating said layers and traversed by said tie-bolts.

* * * * *